M. E. ABBEY.
Improvement in Hames for Harness.
No. 131,986. Patented Oct. 8, 1872.
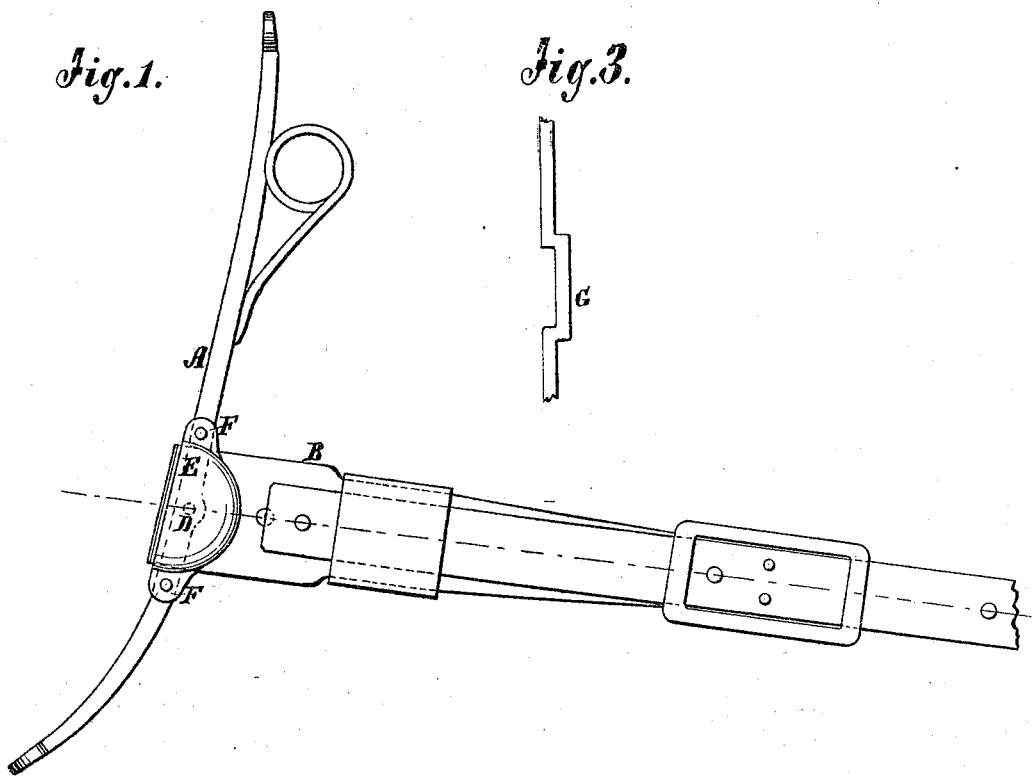
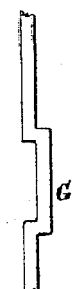
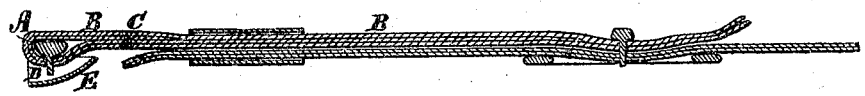
Witnesses:
A. Benneckendorf.
W. O. Graham
Inventor:
M. E. Abbey.
per Munn & Co.
Attorneys.

UNITED STATES PATENT OFFICE.

MASON ELLIS ABBEY, OF SARDIS, MISSISSIPPI.

IMPROVEMENT IN HAMES FOR HARNESS.

Specification forming part of Letters Patent No. 131,986, dated October 8, 1872.

CASE A.

*To all whom it may concern:*

Be it known that I, M. E. ABBEY, of Sardis, county of Panola, State of Mississippi, have invented a new and useful Improvement in Harness, of which the following is a specification:

My invention relates to connecting traces to hames, as hereinafter described.

Figure 1 is a side elevation of a hame and part of a trace, showing the trace looped directly around the hame, and said loop protected by a metal shield. Fig. 2 is a section of Fig. 1 on the line $x\ x$ of Fig. 1. Fig. 3 is a section of a hame, showing a shape that may be had where the trace loops around it to prevent the trace from being pressed into the collar.

A represents the hame, which I propose to make wholly of iron, and B represents the trace or the part to be attached to the hame, which is represented as looped directly around the hame and riveted at C. D is a stud-pin on the hame passing through the trace to hold it from moving up and down. E is a metal shield fitting on the hame over the leather loop and riveted at F. This, also, keeps the trace from moving up and down. Said shield may be cast together with the hame. When attaching the trace in this way I prefer to have the hame bent outward and upward, as shown at G, Fig. 3, to provide room between it and the collar for the trace-straps; and I make it round and have a friction-sleeve put on it, inside of the loop, to take the wear.

What I claim is—

1. The trace B looped around the hame and protected by the shield E, constructed as shown and described.

2. A hame bent outward, as shown at G, for the purpose specified.

MASON ELLIS ABBEY.

Witnesses:
P. U. MOORE,
JOHN C. HARRISON.